United States Patent
Belcea

(10) Patent No.: US 7,409,220 B2
(45) Date of Patent: Aug. 5, 2008

(54) AUTONOMOUS REFERENCE SYSTEM AND METHOD FOR MONITORING THE LOCATION AND MOVEMENT OF OBJECTS

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 11/197,951

(22) Filed: Aug. 5, 2005

(65) Prior Publication Data

US 2006/0029010 A1    Feb. 9, 2006

Related U.S. Application Data

(60) Provisional application No. 60/598,833, filed on Aug. 5, 2004.

(51) Int. Cl.
*H04Q 7/20* (2006.01)

(52) U.S. Cl. ......... 455/457; 455/456.1; 455/456.2; 455/456.3; 455/456.6; 455/41.2; 455/404.2; 370/400

(58) Field of Classification Search ......... 370/328–329, 370/331–332, 252, 400; 455/41.1–2, 456.1, 455/3, 456.5–6, 456.2, 456.3, 456.6, 457, 455/404.2
See application file for complete search history.

(56) References Cited

U.S. PATENT DOCUMENTS

| | | | |
|---|---|---|---|
| 6,453,168 B1 | 9/2002 | McCrady | |
| 6,486,831 B1 | 11/2002 | Martorana | |
| 6,539,231 B1 | 3/2003 | Hamilton | |
| 6,600,927 B2 | 7/2003 | Hamilton | |
| 6,665,333 B2 | 12/2003 | McCrady | |
| 6,807,165 B2 | 10/2004 | Belcea | |
| 6,873,839 B2 | 3/2005 | Stanforth | |
| 7,042,867 B2 * | 5/2006 | Whitehill et al. | 370/338 |
| 7,085,576 B2 * | 8/2006 | Ranganathan | 455/456.1 |
| 7,126,951 B2 * | 10/2006 | Belcea et al. | 370/400 |
| 7,142,524 B2 * | 11/2006 | Stanforth et al. | 370/328 |
| 2002/0058502 A1 | 5/2002 | Stanforth | |
| 2006/0014547 A1 * | 1/2006 | Walter | 455/456.1 |
| 2006/0029009 A1 | 2/2006 | Alapuranen | |

* cited by examiner

*Primary Examiner*—Tuan A Tran
(74) *Attorney, Agent, or Firm*—Randi L. Karpinia; Joseph J. Buczynski

(57) ABSTRACT

The present invention relates to a system and method for deploying devices, such as routers (107) and mobile nodes (102) or tags, that communicate in a wireless multihopping ad-hoc communication network (100), that enables a monitoring system such as a dispatcher (212) to create a reference system to identify the location of each device. The system and method thus allows for prompt identification of the locations of persons or items, particularly firefighters and other persons operating in hazardous environments, to expedite rescue efforts.

20 Claims, 3 Drawing Sheets

AUTONOMOUS REFERENCE SYSTEM AND METHOD FOR MONITORING THE LOCATION AND MOVEMENT OF OBJECTS

This application claims the benefit of U.S. Provisional Application No. 60/598,833, filed Aug. 5, 2004, the entire content being incorporated herein by reference.

CROSS-REFERENCE TO RELATED APPLICATIONS

Related subject matter is described in copending U.S. patent application Ser. No. 11/197,950 of Pertti O. Alapuranen and John M. Belcea entitled "Bandwidth Efficient System and Method for Ranging Nodes in a Wireless Communications Network", filed concurrently herewith and incorporated herein by reference.

FIELD OF THE INVENTION

The present invention relates to an autonomous reference system and method for monitoring the location and movement of objects. More particularly, the present invention relates to a system and method for deploying wireless routers and mobile nodes operating in a wireless multihopping ad-hoc network to create a reference system that allows identification of the locations of persons or items, particularly firefighters and other persons operating in hazardous environments.

BACKGROUND

A Rapid Intervention Crew (RIC) is attached to each firefighting unit dealing with a fire incident. While other personnel are fighting the fire, this team stays on the side waiting in case somebody needs to be rescued. If any firefighter or group asks for help or does not answer when called, the RIC enter the action and proceed to the rescue operation. First, they have to find out the location of the firefighters to be rescued, then they proceed with the rescue. The procedure currently in use requires that RIC proceed first to the last known location of the firefighters in need, from where they start searching. Because of heat, low visibility and other factors, the firefighters may become confused and could report incorrect positions. In such cases the search may be conducted in inappropriate places delaying the rescue process, sometimes with fatal consequence.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
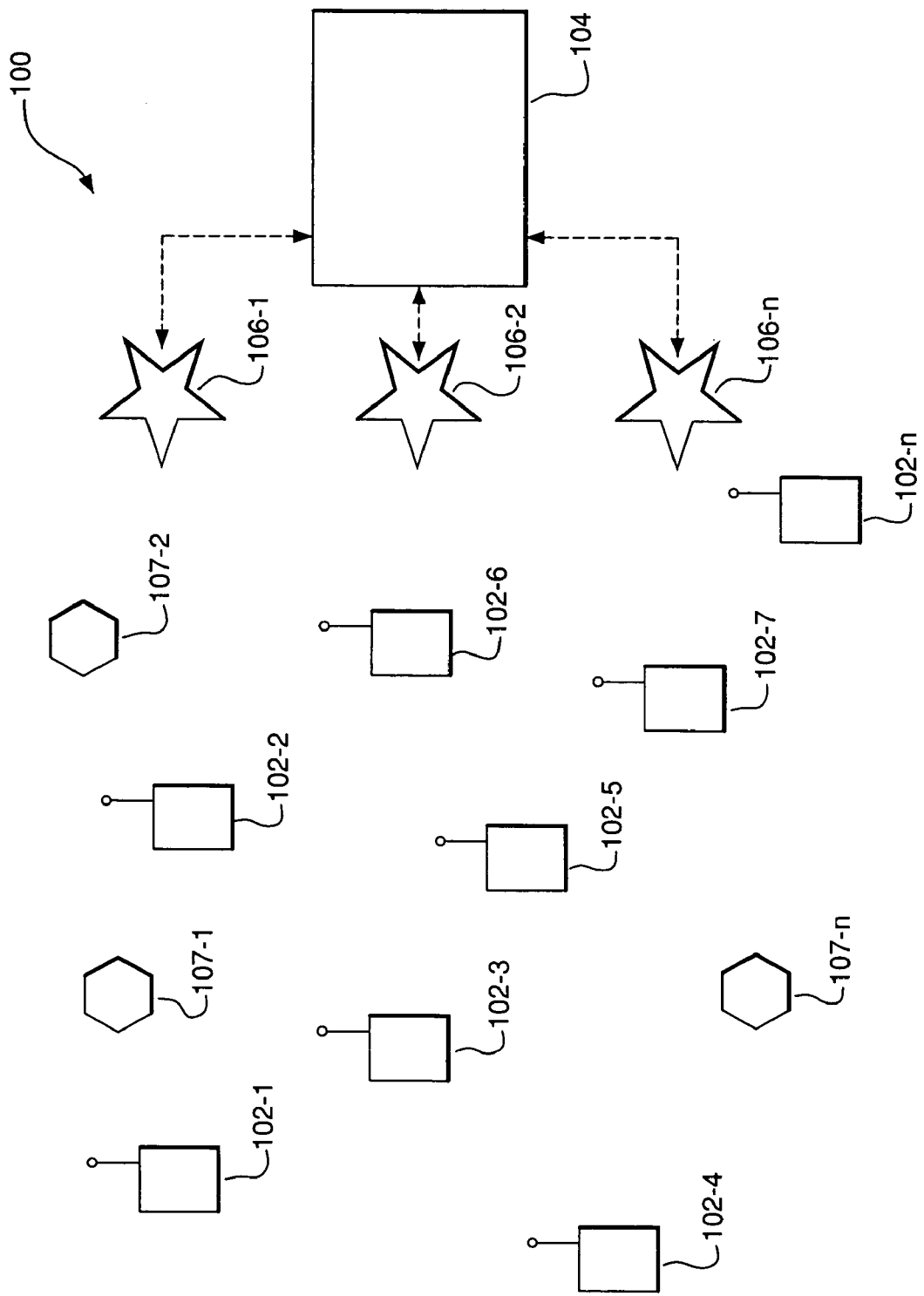
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an autonomous reference system and method for monitoring the location and movement of objects. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an autonomous reference system and method for monitoring the location and movement of objects described herein. The non-processor circuits may include, but are not limited to, a radio receiver, a radio transmitter, signal drivers, clock circuits, power source circuits, and user input devices. As such, these functions may be interpreted as steps of a method to perform operations for monitoring the location and movement of objects. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described in more detail below, the present invention provides an autonomous system and method that is capably of monitoring the location of a person or item, to thus expedite a search and rescue process, in particular, a search and rescue of a firefighter. The system comprises a number of routers and mobile nodes or "tags" that organize themselves as a network as they are deployed therefore they create an ad-hoc multi-hopping network. Each device has double functionality: collecting range data (TOF) and providing multihopping network services for transporting data to dispatcher. The range data is processed in order to locate the object to which any mobile nodes or tags are attached. The location of the routers can also be identified in this manner.

Turning now to the figures, FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes" or "terminals".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. No. 09/897,790 and U.S. Pat. Nos. 6,807,165 and 6,873,839 referenced above.

Figure 2:
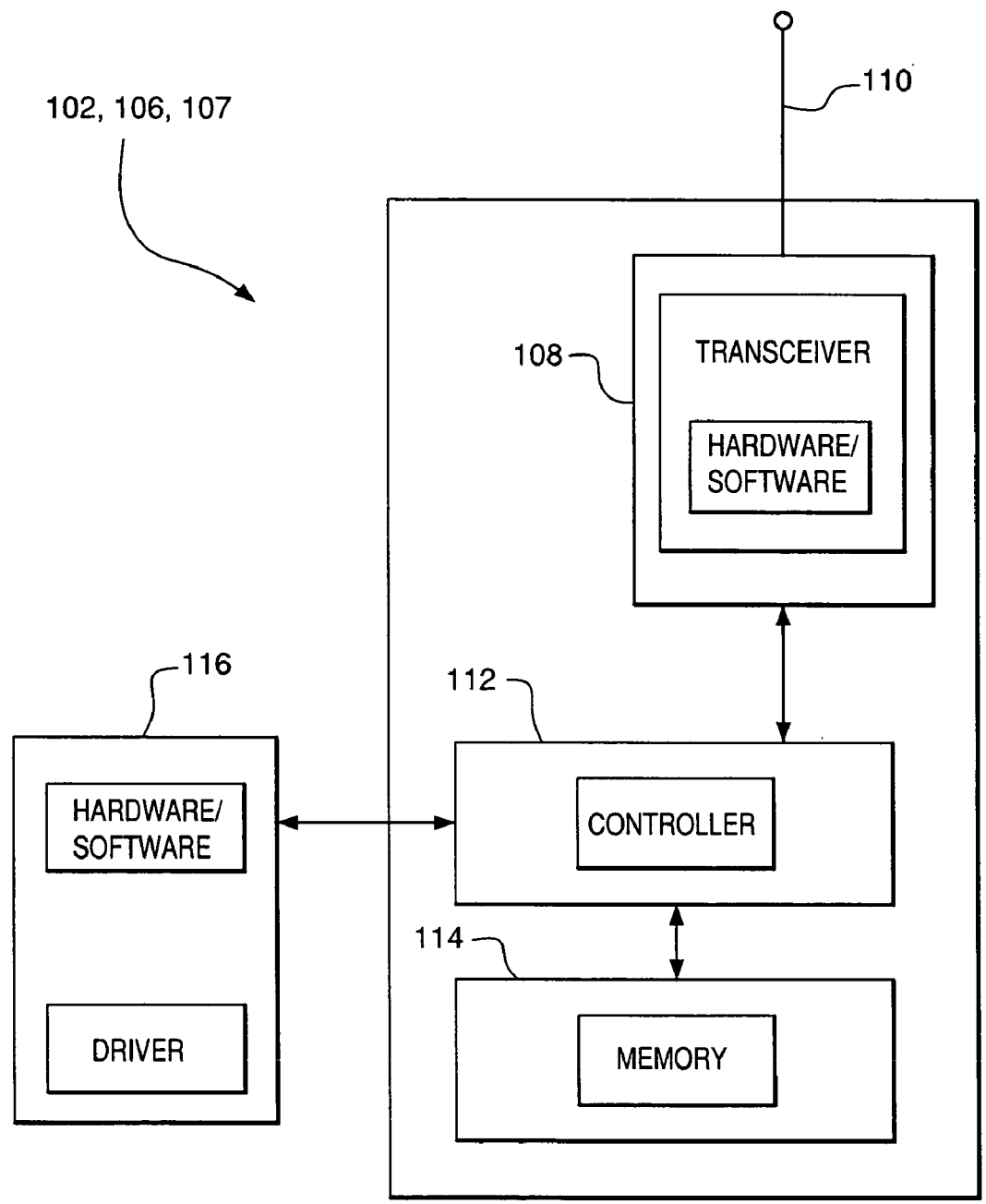
FIG. 2 is a block diagram illustrating an example of a node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
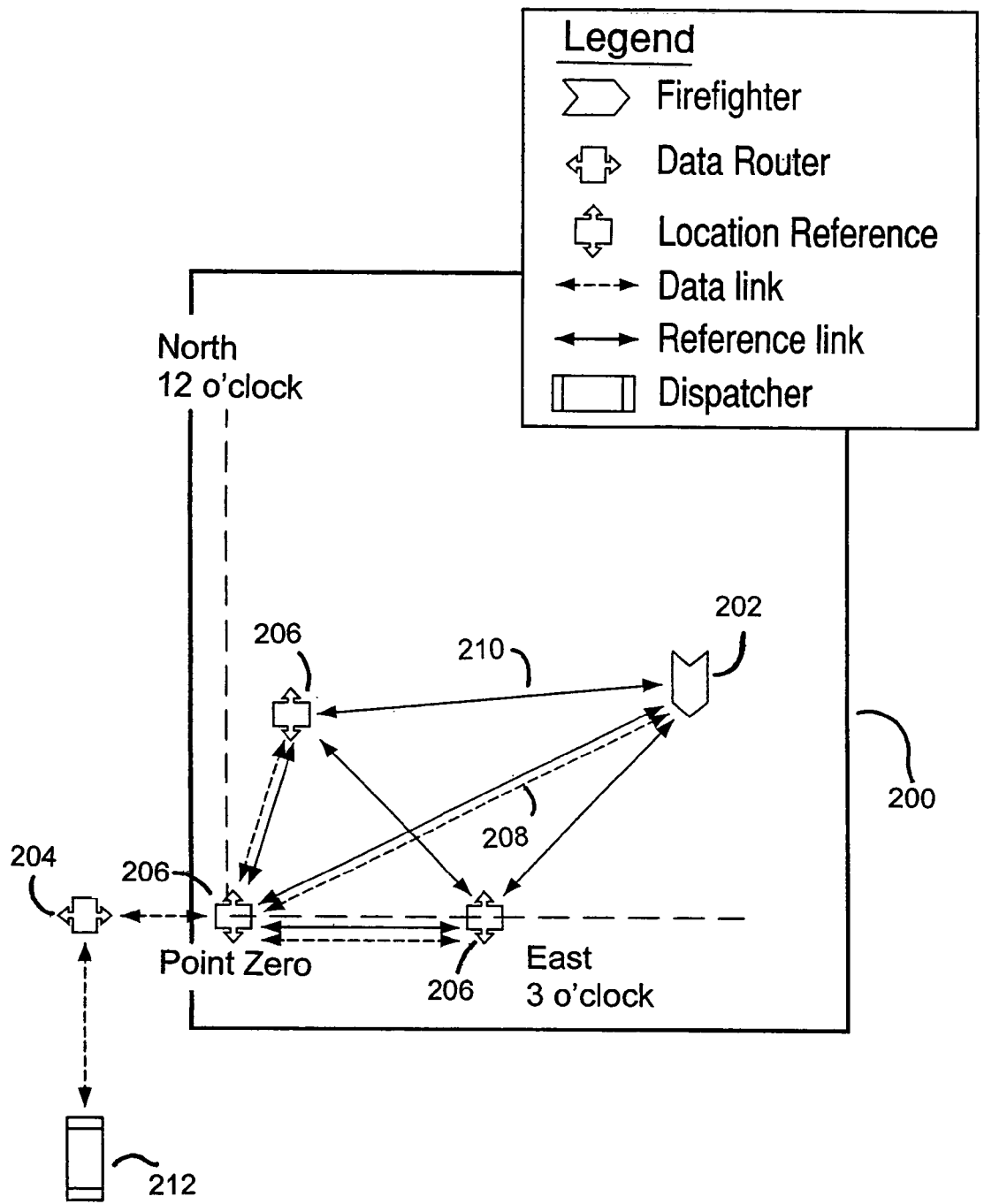
FIG. 3 is a block diagram of an example of a network as shown in FIG. 1 deployed to create a reference system in accordance with an embodiment of the present invention.

FIG. 3 illustrates a rescue operation in progress utilizing the present invention with a Rapid Intervention Crew (RIC) operating on a single building floor 200. While proceeding towards the last known position of the firefighter 202, the RIC deploys data routers 204 that provide data transfer over data links 208 between the RIC and a monitoring device, which can be referred to as a dispatcher 212. These routers 204 can be deployed on a flat area before entering the building and on several floors while the RIC advances upward into the building.

It should also be noted that the location references 206 and data routers 204 represent identical or similar equipment. The difference between them is that the data routers 204 are generally too far from the scene to receive radio signals from the firefighter 202. The location references 206 are closer and can exchange signals with the firefighter 202. The exchanges of signals have as primary purpose of collecting the time of flight (TOF) data between all routers and firefighter's wireless movable device located on the same floor. The location references 206 collect TOF data between each other and between each location reference 206 and a firefighter 202 that is equipped with a movable device, such as a mobile node 102 shown in FIGS. 1 and 2, that can be referred to as a "tag". The firefighter 202 also collects the TOF between other firefighter 202 and each location reference 206. Any device, such as the MEA™ WMC 6300 manufactured by Motorola, Inc., that can (1) measure distances and (2) provide transport of data to a processing location, can be used as a data router 204, location reference 206, mobile node 102 or tag. Examples of techniques for collecting TOF are presented in U.S. Pat. Nos. 6,453,168, 6,486,831, 6,539,231, 6,600,927, and 6,665,333. These patents and all other documents cited herein are incorporated herein by reference in their entirety.

The exchanges of messages that have the primary purpose of collecting TOF are presented in FIG. 3 as reference links 210. The collected TOF values in this example are transferred by data links 208 to the dispatcher 212 for processing. On the scene, the location references 206 can provide multi-hopping services for transferring TOF data on these data links 208. When the signal leaves the scene, the data routers 204 provide the transfer using the multi-hopping capability to the dispatcher 212. In summary, the reference links 210 are mainly used for collecting TOF data, while the data links 208 are used for transporting collected data to the dispatcher 212.

RIC Team Components

The team has one leader that directs the team search and a suitable number of members, for example, at least four members, that are involved in search and rescue operation. The leader remains outside the operating field and directs the team based on information provided by the dispatcher 212. The dispatcher 212 can include, for example, a software component installed in a laptop computer with a MEA™ WMC 6300™ interface. The leader is in continuous radio connection with its team.

Router Deployment

When the team turns on a router (such as router 107 as shown in FIG. 1), the active router can be deployed as a location reference 206 and is shown on the screen of the dispatcher 212. When the router is deployed on a floor 200 as a location reference 206, the leader enters the floor number where the device is deployed. When entering the firefighter's floor, the RIC deploys one router in front of the elevator or the stairwell door. It is called "Point Zero." The dispatcher 212 shows the "Point Zero" router in the middle of the searching scene screen, for example. The RIC deploys a second router 107 named "East" or "3 o'clock" at 5 (five) to 25 (twenty-five) meters distance from Point Zero. The dispatcher shows the East router on the right side of the Point Zero at a distance corresponding to the TOF measured between Point Zero and the East router. On the left or right side of the direction from Point Zero to the East router, the RIC deploys a third router called "North" or "12 o'clock." It should be at 5 (five) to 25 (twenty-five) meter distance from "point Zero".

The three deployed routers 107 thus create a triangle, where the angle between the direction from Point Zero to North and the direction from Point Zero to East is preferably 90 (ninety) degrees or about 90 (ninety) degrees. Although the system works for any size of the angle, the highest precision of computation is achieved when the angle is close to 90 (ninety) degrees, while almost collinear placement of routers causes the worst computation of precision. The routers 107 can be identified by their own names, but, the search procedure does not require such identification. With the deployment of these three routers 107, RIC has defined the horizontal system of coordinates with the routers 107 operation a location references 206. The dispatcher displays on the screen the relative positions of the three location references 206, the position of the firefighter 202, and the position of each member of the RIC, within the bounded area representing the floor of the building, in a manner similar to the block diagram shown in FIG. 3, for example. When the search for a firefighter 202 is executed in a building or other type of structure with a variation in elevation, the first three routers 107 must be on the same or about the same plane (e.g., on the same floor), which is a horizontal plane, or substantially or relatively horizontal plane, while a fourth router 107 must be placed on a different plane from the three previously deployed routers 107.

Coordinates Computation

The computation of the coordinates depends on the number of routers 107 (location references 206) deployed at every moment. When only Point Zero was deployed, the location of a firefighter 202 could be anywhere in a sphere around Point Zero at a radius of the distance computed from the TOF between Point Zero and the firefighter. As more routers 107 are deployed, the location of a firefighter 202 is computed more accurately.

In this location system, the information about all n stationary devices is processed at the same time. Some of the stationary devices could be routers providing location references 206, and some could be firefighters' tags or mobile nodes 102. The distance between devices is computed from TOF, which is a measured quantity and therefore is affected by random errors.

$$\rho_{i,j} = \sqrt{(x_i-x_j)^2+(y_i-y_j)^2+(z_i-z_j)^2}, \quad i,j=1,2, \qquad \text{Equation 1}$$

In this equation, the indexes i and j identify two routers with coordinates $(x_i, y_i, z_i)$ and $(x_j, y_j, z_j)$. The correct distance between any two routers is $\rho_{i,j}$. This is an unknown distance as the correct positions of all routers are initially unknown. The same distance is also estimated by the measured range $r_{j,i}$ from the TOF between router j and router i. Because these values are measured, $r_{i,j} \neq r_{j,i}$ because of measuring errors, while $\rho_{i,j} = \rho_{j,i}$. For any set of coordinates of considered routers, the differences between measured and computed distances are:

$$\epsilon_{i,j} = \rho_{i,j} - r_{i,j}, \quad i,j=1,2,\ldots n \qquad \text{Equation 2}$$

In Equation 2 each error $\epsilon_{i,j}$ is a function of six variables: $x_i$, $y_i$, $z_i$, $x_j$, $y_j$, and $z_j$. The error function E shows the precision of the current estimation:

$$E = \sum_i \sum_{j,j \neq i} \epsilon_{i,j}^2 \qquad \text{Equation 3}$$

Although not explicitly shown, E is a function of 3n variables $(x_i, y_i, z_i)$ i=1, 2, ... n, most of them unknown. The most probable coordinates of routers are those values that minimize the error function E:

$$\begin{cases} \dfrac{\partial E}{\partial x_k} = \sum_i \sum_{j \neq i} \dfrac{\partial \epsilon_{i,j}^2}{\partial x_k} = 2\sum_i \sum_{j \neq i} \epsilon_{i,j} \dfrac{\partial \epsilon_{i,j}}{\partial x_k} = 0 \\[4pt] \dfrac{\partial E}{\partial y_k} = \sum_i \sum_{j \neq i} \dfrac{\partial \epsilon_{i,j}^2}{\partial y_k} = 2\sum_i \sum_{j \neq i} \epsilon_{i,j} \dfrac{\partial \epsilon_{i,j}}{\partial y_k} = 0 \\[4pt] \dfrac{\partial E}{\partial z_k} = \sum_i \sum_{j \neq i} \dfrac{\partial \epsilon_{i,j}^2}{\partial z_k} = 2\sum_i \sum_{j \neq i} \epsilon_{i,j} \dfrac{\partial \epsilon_{i,j}}{\partial z_k} = 0; \end{cases} \qquad \text{Equation 4}$$

$$k = 1, 2, \ldots n$$

From Equation 2 the derivative of $\delta_{i,j}$ can be computed as follows:

$$\dfrac{\partial \epsilon_{i,j}}{\partial x_k} = \dfrac{\partial \rho_{i,j}}{\partial x_k} = \qquad \text{Equation 5}$$

$$\dfrac{\partial \sqrt{(x_i-x_j)^2+(y_i-y_j)^2+(z_i-z_j)^2}}{\partial x_k} =$$

$$\dfrac{1}{2} \dfrac{2(x_i-x_j)\left(\dfrac{\partial x_i}{\partial x_k} - \dfrac{\partial x_j}{\partial x_k}\right)}{\sqrt{(x_i-x_j)^2+(y_i-y_j)^2+(z_i-z_j)^2}} = \dfrac{(x_{ij}-x_i)(\delta_k^i - \delta_k^j)}{\rho_{i,j}}$$

$$\dfrac{\partial \epsilon_{i,j}}{\partial y_k} = \dfrac{(y_i - y_j)(\delta_k^i - \delta_k^j)}{\rho_{i,j}}$$

$$\dfrac{\partial \epsilon_{i,j}}{\partial z_k} = \dfrac{(z_i - z_j)(\delta_k^i - \delta_k^j)}{\rho_{i,j}}$$

In Equation 5 the symbol $\delta_k^i$ is equal to one when i=k and zero in all other cases. The symbol is known as "Kronecker delta symbol" and is a particularization of the Dirac delta function. The complement of Kronecker symbol $\overline{\delta_k^i}$ which is equal to zero is used in a case when i=k or in any other case that the complement is suitable as can be appreciated by one skilled in the art.

$$(x_i - x_j)(\delta_k^i - \delta_k^j) = \begin{cases} i \neq k \wedge j \neq k \Rightarrow 0 \\ i = k \wedge j \neq k \Rightarrow x_k - x_j \\ i \neq k \wedge j = k \Rightarrow x_k - x_i \\ i = k \wedge j = k \Rightarrow 0 \end{cases} \qquad \text{Equation 6}$$

$$(y_i - y_j)(\delta_k^i - \delta_k^j) = \begin{cases} i \neq k \wedge j \neq k \Rightarrow 0 \\ i = k \wedge j \neq k \Rightarrow y_k - y_j \\ i \neq k \wedge j = k \Rightarrow y_k - y_i \\ i = k \wedge j = k \Rightarrow 0 \end{cases}$$

$$(z_i - z_j)(\delta_k^i - \delta_k^j) = \begin{cases} i \neq k \wedge j \neq k \Rightarrow 0 \\ i = k \wedge j \neq k \Rightarrow z_k - z_j \\ i \neq k \wedge j = k \Rightarrow z_k - z_i \\ i = k \wedge j = k \Rightarrow 0 \end{cases}$$

Replacing the derivative of $\epsilon_{i,i}$ and using $\overline{\delta_j^i}$ for avoiding addition of $\epsilon_{i,i}$ in Equation 4, the equations become:

Equation 7
$$\begin{cases} \sum_i \sum_j \overline{\delta_j^i} \epsilon_{i,j} \frac{(x_i - x_j)(\delta_k^i - \delta_k^j)}{\rho_{i,j}} = \sum_i \sum_j \overline{\delta_j^i} \delta_k^i (\rho_{i,j} - r_{i,j}) \frac{x_i - x_j}{\rho_{i,j}} + \\ \sum_i \sum_j \overline{\delta_j^i} \delta_k^j (\rho_{i,j} - r_{i,j}) \frac{x_j - x_i}{\rho_{i,j}} = \sum_j \overline{\delta_j^k} (\rho_{k,j} - r_{k,j}) \frac{x_k - x_j}{\rho_{k,j}} + \\ \sum_i \overline{\delta_k^i} (\rho_{i,k} - r_{i,k}) \frac{x_k - x_i}{\rho_{i,k}} = \sum_i \overline{\delta_k^i} \left(1 - \frac{r_{k,j}}{\rho_{i,k}}\right)(x_k - x_i) + \\ \sum_i \overline{\delta_k^i} \left(1 - \frac{r_{i,k}}{\rho_{i,k}}\right)(x_k - x_i) = \sum_i \overline{\delta_k^i} \left(2 - \frac{r_{i,k} + r_{k,j}}{\rho_{i,k}}\right)(x_k - x_i) = 0 \\ \sum_i \sum_j \overline{\delta_j^i} \epsilon_{i,j} \frac{(y_i - y_j)(\delta_k^i - \delta_k^j)}{\rho_{i,j}} = \sum_i \overline{\delta_k^i} \left(2 - \frac{r_{i,k} + r_{k,j}}{\rho_{i,k}}\right)(y_k - y_i) = 0 \\ \sum_i \sum_j \overline{\delta_j^i} \epsilon_{i,j} \frac{(z_i - z_j)(\delta_k^i - \delta_k^j)}{\rho_{i,j}} = \sum_i \overline{\delta_k^i} \left(2 - \frac{r_{i,k} + r_{k,i}}{\rho_{i,k}}\right)(z_k - z_i) = 0 \end{cases}$$

$k = 1, 2, \ldots n$

This is a nonlinear system of 3n equations that is solved iteratively using the first degree terms of Taylor series. The previous three functions can be decomposed as:

Equation 8
$$\begin{cases} Fx_k^0 + \sum_l (ax_{k,l} |_0 \delta x_l) + \sum_l (ay_{k,l} |_0 \delta y_l) + \sum_l (az_{k,l} |_0 \delta z_l) = 0 \\ Fy_k^0 + \sum_l (bx_{k,l} |_0 \delta x_l) + \sum_l (by_{k,l} |_0 \delta y_l) + \sum_l (bz_{k,l} |_0 \delta z_l) = 0 \\ Fz_k^0 + \sum_l (cx_{k,l} |_0 \delta x_l) + \sum_l (cy_{k,l} |_0 \delta y_l) + \sum_l (cz_{k,l} |_0 \delta z_l) = 0; \end{cases}$$

$k = 1, 2, \ldots n$

The iterative process starts with selecting some initial values $(x_i^0, y_i^0, z_i^0)$; $i=1, 2, \ldots n$ for the unknown variables. With Equation 8 are computed the corrections $(\delta x_i, \delta y_i, \delta z_i)$; $i=1, 2, \ldots n$ that are then used for finding improved values of the coordinates:

Equation 9
$$\begin{cases} x_i = x_i^0 + \delta x_i \\ y_i = y_i^0 + \delta y_i \\ z_i = z_i^0 + \delta z_i; \end{cases}$$

$i = 1, 2, \ldots n$

The first term in each line of Equation 8 is:

Equation 10
$$Fx_k^0 = \sum_i \overline{\delta_k^i} \left(2 - \frac{r_{j,k}^0 + r_{k,j}^0}{\rho_{i,k}}\right)(x_k^0 - x_j^0)$$

$$Fy_k^0 = \sum_i \overline{\delta_k^i} \left(2 - \frac{r_{j,k}^0 + r_{k,j}^0}{\rho_{i,k}}\right)(y_k^0 - y_j^0)$$

$$Fz_k^0 = \sum_i \overline{\delta_k^i} \left(2 - \frac{r_{j,k}^0 + r_{k,j}^0}{\rho_{i,k}}\right)(z_k^0 - z_j^0)$$

Other coefficients on Equation 8 are computed as follows:

Equation 11
$$ax_{k,l} = \frac{\partial \left(\sum_i \overline{\delta_k^i} \left(2 - \frac{r_{i,k} + r_{k,j}}{\rho_{i,k}}\right)(x_k - x_i)\right)}{\partial x_l}$$

$$ay_{k,l} = \frac{\partial \left(\sum_i \overline{\delta_k^i} \left(2 - \frac{r_{i,k} + r_{k,j}}{\rho_{i,k}}\right)(x_k - x_i)\right)}{\partial y_l}$$

$$az_{k,l} = \frac{\partial \left(\sum_i \overline{\delta_k^i} \left(2 - \frac{r_{i,k} + r_{k,j}}{\rho_{i,k}}\right)(x_k - x_i)\right)}{\partial z_l}$$

Equation 12
$$bx_{k,l} = \frac{\partial \left(\sum_i \overline{\delta_k^i} \left(2 - \frac{r_{i,k} + r_{k,j}}{\rho_{i,k}}\right)(y_k - y_i)\right)}{\partial x_l}$$

$$by_{k,l} = \frac{\partial \left(\sum_i \overline{\delta_k^i} \left(2 - \frac{r_{i,k} + r_{k,j}}{\rho_{i,k}}\right)(y_k - y_i)\right)}{\partial y_l}$$

$$bz_{k,l} = \frac{\partial \left(\sum_i \overline{\delta_k^i} \left(2 - \frac{r_{i,k} + r_{k,j}}{\rho_{i,k}}\right)(y_k - y_i)\right)}{\partial z_l}$$

Equation 13
$$cx_{k,l} = \frac{\partial \left(\sum_i \overline{\delta_k^i} \left(2 - \frac{r_{i,k} + r_{k,j}}{\rho_{i,k}}\right)(z_k - z_i)\right)}{\partial x_l}$$

$$cy_{k,l} = \frac{\partial \left(\sum_i \overline{\delta_k^i} \left(2 - \frac{r_{i,k} + r_{k,j}}{\rho_{i,k}}\right)(z_k - z_i)\right)}{\partial y_l}$$

$$cz_{k,l} = \frac{\partial \left(\sum_i \overline{\delta_k^i} \left(2 - \frac{r_{i,k} + r_{k,j}}{\rho_{i,k}}\right)(z_k - z_i)\right)}{\partial z_l}$$

Equation 14
$$ax_{k,l} = \frac{\partial \sum_i \overline{\delta_k^i} \left(2 - \frac{r_{i,k} + r_{k,i}}{\rho_{i,k}}\right)(x_k - x_i)}{\partial x_l} =$$

$$\sum_i \overline{\delta_k^i} \frac{\partial \left(2 - \frac{r_{i,k} + r_{k,i}}{\rho_{i,k}}\right)(x_k - x_i)}{\partial x_l} =$$

$$\sum_i \overline{\delta_k^i} \frac{\partial \left(2 - \frac{r_{i,k} + r_{k,i}}{\rho_{i,k}}\right)}{\partial x_l}(x_k - x_i) +$$

$$\sum_i \overline{\delta_k^i} \frac{\partial (x_k - x_i)}{\partial x_l} \left(2 - \frac{r_{i,k} + r_{k,i}}{\rho_{i,k}}\right) =$$

$$\sum_i -\overline{\delta_k^i} (r_{i,k} + r_{k,i})(x_k - x_i) \frac{\partial \left(\frac{1}{\rho_{i,k}}\right)}{\partial x_l} +$$

$$\sum_i \overline{\delta_k^i} \frac{\partial (x_k - x_i)}{\partial x_l} \left(2 - \frac{r_{i,k} + r_{k,i}}{\rho_{i,k}}\right) =$$

-continued $$\sum_i \overline{\delta_k^i} \frac{(r_{i,k}+r_{k,i})(x_k-x_i)}{\rho_{i,k}^2} \frac{\partial \rho_{i,k}}{\partial x_l} +$$

$$\sum_i \overline{\delta_k^i}(\delta_l^k - \delta_l^i)\left(2 - \frac{r_{i,k}+r_{k,i}}{\rho_{i,k}}\right) =$$

$$\sum_i \overline{\delta_k^i} \frac{(r_{i,k}+r_{k,i})(x_k-x_i)}{\rho_{i,k}^2} \frac{(x_i-x_k)(\delta_l^i-\delta_l^k)}{\rho_{i,k}} +$$

$$\sum_i \overline{\delta_k^i}(\delta_l^k - \delta_l^i)\left(2 - \frac{r_{i,k}+r_{k,i}}{\rho_{i,k}}\right) =$$

$$-\sum_i \overline{\delta_k^i} \frac{(r_{i,k}+r_{k,i})(x_k-x_i)^2}{\rho_{i,k}^3}\delta_l^i +$$

$$\delta_l^k \sum_i \overline{\delta_k^i} \frac{(r_{i,k}+r_{k,i})(x_k-x_i)^2}{\rho_{i,k}^3} +$$

$$\delta_l^k \sum_i \overline{\delta_k^i}\left(2 - \frac{r_{i,k}+r_{k,i}}{\rho_{i,k}}\right) -$$

$$\sum_i \overline{\delta_k^i}\delta_l^i\left(2 - \frac{r_{i,k}+r_{k,i}}{\rho_{i,k}}\right) =$$

$$-\overline{\delta_k^i} \frac{(r_{l,k}+r_{k,l})(x_k-x_l)^2}{\rho_{l,k}^3} +$$

$$\delta_l^k \sum_i \overline{\delta_k^i}\left(2 - \frac{r_{i,k}+r_{k,i}}{\rho_{i,k}} + \frac{(r_{i,k}+r_{k,i})(x_k-x_i)^2}{\rho_{i,k}^3}\right) -$$

$$\overline{\delta_k^i}\left(2 - \frac{r_{l,k}+r_{k,l}}{\rho_{l,k}}\right) =$$

$$\delta_l^k \sum_i \overline{\delta_k^i}\left(2 - \frac{r_{i,k}+r_{k,i}}{\rho_{i,k}}\left(1 - \frac{(x_k-x_i)^2}{\rho_{i,k}^2}\right)\right) -$$

$$\overline{\delta_k^i}\left(2 - \frac{r_{l,k}+r_{k,l}}{\rho_{l,k}}\left(1 - \frac{(x_k-x_l)^2}{\rho_{l,k}^2}\right)\right)$$

$$ay_{k,l} = \frac{\partial \sum_i \overline{\delta_k^i}\left(2 - \frac{r_{i,k}+r_{k,i}}{\rho_{i,k}}\right)(x_k-x_i)}{\partial y_l} = \quad \text{Equation 15}$$

$$\sum_i \overline{\delta_k^i} \frac{\partial\left(2 - \frac{r_{i,k}+r_{k,i}}{\rho_{i,k}}\right)(x_k-x_i)}{\partial y_l} =$$

$$\sum_i \overline{\delta_k^i} \frac{\partial\left(2 - \frac{r_{i,k}+r_{k,i}}{\rho_{i,k}}\right)}{\partial y_l}(x_k-x_i) =$$

$$\sum_i -\overline{\delta_k^i}(r_{i,k}+r_{k,i})(x_k-x_i) \frac{\partial\left(\frac{1}{\rho_{i,k}}\right)}{\partial y_l} =$$

$$\sum_i \overline{\delta_k^i} \frac{(r_{i,k}+r_{k,i})(x_k-x_i)}{\rho_{i,k}^2} \frac{\partial \rho_{i,k}}{\partial y_l} =$$

$$\sum_i \overline{\delta_k^i} \frac{(r_{i,k}+r_{k,i})(x_k-x_i)}{\rho_{i,k}^2} \frac{(y_i-y_k)(\delta_l^i-\delta_l^k)}{\rho_{i,k}} =$$

$$\sum_i \overline{\delta_k^i} \frac{(r_{i,k}+r_{k,i})(x_k-x_i)(y_i-y_k)}{\rho_{i,k}^3}\delta_l^i -$$

$$\delta_l^k \sum_i \overline{\delta_k^i} \frac{(r_{i,k}+r_{k,i})(x_k-x_i)(y_i-y_k)}{\rho_{i,k}^3} =$$

$$\delta_l^k \sum_i \overline{\delta_k^i}\left(\frac{(r_{i,k}+r_{k,i})(x_k-x_i)(y_k-y_j)}{\rho_{i,k}^3}\right) -$$

$$\overline{\delta_k^i} \frac{(r_{l,k}+r_{k,l})(x_k-x_l)(y_k-y_l)}{\rho_{l,k}^3}$$

$$az_{k,l} = \frac{\partial \sum_i \overline{\delta_k^i}\left(2 - \frac{r_{i,k}+r_{k,i}}{\rho_{i,k}}\right)(x_k-x_i)}{\partial z_l} = \quad \text{Equation 16}$$

$$\delta_l^k \sum_i \overline{\delta_k^i}\left(\frac{(r_{i,k}+r_{k,i})(x_k-x_i)(z_k-z_j)}{\rho_{i,k}^3}\right) -$$

$$\overline{\delta_k^i} \frac{(r_{l,k}+r_{k,l})(x_k-x_l)(z_k-z_l)}{\rho_{l,k}^3}$$

$$bx_{k,l} = \frac{\partial \sum_i \overline{\delta_k^i}\left(2 - \frac{r_{i,k}+r_{k,i}}{\rho_{i,k}}\right)(y_k-y_i)}{\partial x_l} = \quad \text{Equation 17}$$

$$\delta_l^k \sum_i \overline{\delta_k^i}\left(\frac{(r_{i,k}+r_{k,i})(y_k-y_i)(x_k-x_j)}{\rho_{i,k}^3}\right) -$$

$$\overline{\delta_k^i} \frac{(r_{l,k}+r_{k,l})(y_k-y_l)(x_k-x_l)}{\rho_{l,k}^3}$$

$$by_{k,l} = \frac{\partial \sum_i \overline{\delta_k^i}\left(2 - \frac{r_{i,k}+r_{k,i}}{\rho_{i,k}}\right)(y_k-y_i)}{\partial y_l} = \quad \text{Equation 18}$$

$$\sum_i \overline{\delta_k^i} \frac{\partial\left(2 - \frac{r_{i,k}+r_{k,i}}{\rho_{i,k}}\right)(x_k-x_i)}{\partial x_l} =$$

$$\delta_l^k \sum_i \overline{\delta_k^i}\left(2 - \frac{r_{i,k}+r_{k,i}}{\rho_{i,k}}\left(1 - \frac{(y_k-y_i)^2}{\rho_{i,k}^2}\right)\right) -$$

$$\overline{\delta_k^i}\left(2 - \frac{r_{l,k}+r_{k,l}}{\rho_{l,k}}\left(1 - \frac{(y_k-y_l)^2}{\rho_{l,k}^2}\right)\right)$$

$$bz_{k,l} = \frac{\partial \sum_i \overline{\delta_k^i}\left(2 - \frac{r_{i,k}+r_{k,i}}{\rho_{i,k}}\right)(y_k-y_i)}{\partial z_l} = \quad \text{Equation 19}$$

$$\delta_l^k \sum_i \overline{\delta_k^i}\left(\frac{(r_{i,k}+r_{k,i})(y_k-y_i)(z_k-z_j)}{\rho_{i,k}^3}\right) -$$

$$\overline{\delta_k^i} \frac{(r_{l,k}+r_{k,l})(y_k-y_l)(z_k-z_l)}{\rho_{l,k}^3}$$

$$cx_{k,l} = \frac{\partial \sum_i \overline{\delta_k^i}\left(2 - \frac{r_{i,k}+r_{k,i}}{\rho_{i,k}}\right)(z_k-z_i)}{\partial x_l} = \quad \text{Equation 20}$$

$$\delta_l^k \sum_i \overline{\delta_k^i}\left(\frac{(r_{i,k}+r_{k,i})(z_k-z_i)(x_k-x_j)}{\rho_{i,k}^3}\right) -$$

$$\overline{\delta_k^i} \frac{(r_{l,k}+r_{k,l})(z_k-z_l)(x_k-x_l)}{\rho_{l,k}^3}$$

$$cy_{k,l} = \frac{\partial \sum_i \overline{\delta_k^i}\left(2 - \frac{r_{i,k}+r_{k,i}}{\rho_{i,k}}\right)(z_k-z_i)}{\partial y_l} = \quad \text{Equation 21}$$

$$\delta_l^k \sum_i \overline{\delta_k^i}\left(\frac{(r_{i,k}+r_{k,i})(z_k-z_i)(y_k-y_j)}{\rho_{i,k}^3}\right) -$$

-continued $$cz_{k,l} = \frac{\partial \sum_i \overline{\delta_k^i}\left(2 - \frac{r_{i,k} + r_{k,i}}{\rho_{i,k}}\right)(z_k - z_i)}{\partial z_l} =$$

$$\sum_i \overline{\delta_k^i} \frac{\partial \left(2 - \frac{r_{i,k} + r_{k,i}}{\rho_{i,k}}\right)(z_k - z_i)}{\partial z_l} =$$

$$\delta_l^k \sum_i \overline{\delta_k^i}\left(2 - \frac{r_{i,k} + r_{k,i}}{\rho_{i,k}}\left(1 - \frac{(z_k - z_i)^2}{\rho_{i,k}^2}\right)\right) -$$

$$\overline{\delta_k^l}\left(2 - \frac{r_{l,k} + r_{k,l}}{\rho_{l,k}}\left(1 - \frac{(z_k - z_l)^2}{\rho_{l,k}^2}\right)\right)$$

Equation 22

Replacing all terms in Equation 8 with terms from Equation 14 to Equation 22 produces the final equations:

$$\sum_i \overline{\delta_k^i}\left(2 - \frac{r_{j,k}^0 + r_{k,j}^0}{\rho_{i,k}}\right)(x_k^0 - x_j^0) +$$

$$\sum_l \left(\delta_l^k \sum_i \overline{\delta_k^i}\left(2 - \frac{r_{i,k} + r_{k,i}}{\rho_{i,k}}\left(1 - \frac{(x_k - x_i)^2}{\rho_{i,k}^2}\right)\right) - \overline{\delta_k^l}\left(2 - \frac{r_{l,k} + r_{k,l}}{\rho_{l,k}}\left(1 - \frac{(x_k - x_l)^2}{\rho_{l,k}^2}\right)\right)\right)\delta x_l +$$

$$\sum_l \left(\delta_l^k \sum_i \overline{\delta_k^i}\left(\frac{(r_{i,k} + r_{k,i})(x_k - x_i)(y_k - y_j)}{\rho_{i,k}^3}\right) - \overline{\delta_k^l}\frac{(r_{l,k} + r_{k,l})(x_k - x_l)(y_k - y_l)}{\rho_{l,k}^3}\right)\delta y_l +$$

$$\sum_l \left(\delta_l^k \sum_i \overline{\delta_k^i}\left(\frac{(r_{i,k} + r_{k,i})(x_k - x_i)(z_k - z_j)}{\rho_{i,k}^3}\right) - \overline{\delta_k^l}\frac{(r_{l,k} + r_{k,l})(x_k - x_l)(z_k - z_l)}{\rho_{l,k}^3}\right)\delta z_l = 0$$

Equation 23

$$\sum_i \overline{\delta_k^i}\left(2 - \frac{r_{j,k}^0 + r_{k,j}^0}{\rho_{i,k}}\right)(y_k^0 - y_j^0) +$$

$$\sum_l \left(\delta_l^k \sum_i \overline{\delta_k^i}\left(\frac{(r_{i,k} + r_{k,i})(y_k - y_i)(x_k - x_j)}{\rho_{i,k}^3}\right) - \overline{\delta_k^l}\frac{(r_{l,k} + r_{k,l})(y_k - y_l)(x_k - x_l)}{\rho_{l,k}^3}\right)\delta x_l +$$

$$\sum_l \left(\delta_l^k \sum_i \overline{\delta_k^i}\left(2 - \frac{r_{i,k} + r_{k,i}}{\rho_{i,k}}\left(1 - \frac{(y_k - y_i)^2}{\rho_{i,k}^2}\right)\right) - \overline{\delta_k^l}\left(2 - \frac{r_{l,k} + r_{k,l}}{\rho_{l,k}}\left(1 - \frac{(y_k - y_l)^2}{\rho_{l,k}^2}\right)\right)\right)\delta y_l +$$

$$\sum_l \left(\delta_l^k \sum_i \overline{\delta_k^i}\left(\frac{(r_{i,k} + r_{k,i})(y_k - y_i)(z_k - z_j)}{\rho_{i,k}^3}\right) - \overline{\delta_k^l}\frac{(r_{l,k} + r_{k,l})(y_k - y_l)(z_k - z_l)}{\rho_{l,k}^3}\right)\delta z_l = 0$$

$$\sum_i \overline{\delta_k^i}\left(2 - \frac{r_{j,k}^0 + r_{k,j}^0}{\rho_{i,k}}\right)(z_k^0 - z_j^0) +$$

$$\sum_l \left(\delta_l^k \sum_i \overline{\delta_k^i}\left(\frac{(r_{i,k} + r_{k,i})(z_k - z_i)(x_k - x_j)}{\rho_{i,k}^3}\right) - \overline{\delta_k^l}\frac{(r_{l,k} + r_{k,l})(z_k - z_l)(x_k - x_l)}{\rho_{l,k}^3}\right)\delta x_l +$$

$$\sum_l \left(\delta_l^k \sum_i \overline{\delta_k^i}\left(\frac{(r_{i,k} + r_{k,i})(z_k - z_i)(y_k - y_j)}{\rho_{i,k}^3}\right) - \overline{\delta_k^l}\frac{(r_{l,k} + r_{k,l})(z_k - z_l)(y_k - y_l)}{\rho_{l,k}^3}\right)\delta y_l +$$

$$\sum_l \left(\delta_l^k \sum_i \overline{\delta_k^i}\left(2 - \frac{r_{i,k} + r_{k,i}}{\rho_{i,k}}\left(1 - \frac{(z_k - z_i)^2}{\rho_{i,k}^2}\right)\right) - \overline{\delta_k^l}\left(2 - \frac{r_{l,k} + r_{k,l}}{\rho_{l,k}}\left(1 - \frac{(z_k - z_l)^2}{\rho_{l,k}^2}\right)\right)\right)\delta z_l = 0$$

Equation 23 is used for computing the coordinates of a system of stationary devices measuring the relative distance between them. The system has 3n equations and the same number of unknown variables $\delta x_i$, $\delta y_i$, $\delta z_i$. The solution of the system of equations provides the value of $\delta x_i$, $\delta y_i$, $\delta z_i$ that are the corrections to be applied to the supposed position of each router in the system. From the mathematical point of view, the system of equations does not have a unique solution, but an infinite number of "correct" solutions. The word "correct" means that in all configurations the computed positions of routers are in concert with the measured distances between them.

Those skilled in the will easily recognize that the error function E could be also minimized by other methods.

With regard to the error function E discussed above and the index i, assuming that the "Point Zero" router has i=1, the "East" router has i=2, the third deployed router has i=3 and the fourth deployed router has i=4, the system must verify the following set of constraints:

1 The following coordinates have fixed predefined values:

$$\begin{cases} x_1 = 0 \\ y_1 = 0 \\ z_1 = 0 \\ y_2 = 0 \\ z_2 = 0 \\ z_3 = 0 \end{cases}$$

Equation 24

2 The sign of the Y coordinate of the third router corresponds to the deployment conditions.

3 The sign of the Z coordinates of the fourth router corresponds to the deployment conditions.

These three constraints must be observed in order to assure that the computed configuration is not a rotation, translation or a reflection of the correct configuration. They assure that from the infinite number of possible solutions, is selected the solution that matches the reference system that has been created when Point Zero, East and North routers were deployed.

After solving the linear system of equations, for selecting the solution matching the reference system, the following steps have to be executed at the end of each iteration:

1 After new coordinates are computed, is executed a translation that makes "Point Zero" the origin of the coordinates.

$$\begin{cases} x'_i = x^0_i - x^0_1 \\ y'_i = y^0_i - y^0_1 \\ z'_i = z^0_i - z^0_1; \quad i = 1, 2, \ldots n \end{cases}$$

After this translation, "Point Zero" has coordinates:

$$\begin{cases} x_1 = 0 \\ y_1 = 0 \\ z_1 = 0 \end{cases}$$

2 On next step is executed a rotation around the OZ axis for bringing the "East" router on the of ZOX plane, which means to have $y_2=0$. The rotation equations are:

$$\sin Ry = \frac{y_2}{\sqrt{x_2^2 + y_2^2}}$$

$$\cos Ry = \frac{x_2}{\sqrt{x_2^2 + y_2^2}}$$

$$\begin{cases} x'_i = x_i * \cos Ry + y_i * \sin Ry \\ y'_i = -x_i * \sin Ry + y_i * \cos Ry \\ z'_i = z_i \quad i = 2, 3, \ldots n \end{cases}$$

3 On third step a rotation around the OY axis should bring the "East" router in the OX axis, which means to have $y_2=0$ and $z_2=0$.

$$\sin Rz = \frac{z_2}{\sqrt{x_2^2 + z_2^2}}$$

$$\cos Rz = \frac{x_2}{\sqrt{x_2^2 + z_2^2}}$$

$$\begin{cases} x'_i = x_i * \cos Rz + z_i * \sin Ry \\ y'_i = y_i \\ z'_i = -x_i * \sin Rz + z_i * \cos Rz \quad i = 2, 3, \ldots n \end{cases}$$

4 On next step the coordinates of routers are rotated around the OX axis to bring the third router in the OXY plane, which means to have $z_3=0$.

$$\sin Rx = \frac{z_2}{\sqrt{y_2^2 + z_2^2}}$$

$$\cos Rx = \frac{y_2}{\sqrt{y_2^2 + z_2^2}}$$

$$\begin{cases} x'_i = x'_i \\ y'_i = y_i * \cos Rx + z_i * \sin Rx \\ z'_i = -y_i * \sin Rx + z_i * \cos Rx \quad i = 2, 3, \ldots n \end{cases}$$

5 On next step is checked the symmetry of the result against the ZOY plane. If the sign of $x_2$ is not the expected sign, all $x_i$, for $i=2, 3, \ldots$ n need to have their sign changed, which assures that the "East" router has correct coordinates.

6 On next step is checked the symmetry of the result against the XOZ plane. If $y_3$ does not have the expected sign, all $y_i$, $i=2, 3, \ldots$ n, need to have the sign changed, which assures that the third deployed router has correct $y_3$ coordinate.

7 In the final step is checked the symmetry of the result against the XOY plane. If the search is executed in a plane (one floor only), this check is not required because all routers must have $z_i=0$. If the search is executed in three dimensional space, the sign of $z_4$ is verified. If the sign is incorrect, all $z_i$ have their sign changed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A location determining system, comprising:
   first, second and third routers, adapted for placement in a relatively horizontal plane in a bounded area, such that a first direction intersecting the first and second routers is about perpendicular to a second direction intersecting the first and third routers, and each of the first, second and third routers being adapted to communicate in a wireless multihopping network to exchange location information with each other pertaining to their respective locations relative to each other;
   at least one movable device, adapted to communicate with the first, second and third routers in the wireless multihopping network to exchange with the first, second and third routers location information pertaining to its location; and
   a monitoring device, adapted to receive the location information pertaining to the first, second and third routers and the movable device and to establish, based on the received location information, a reference system identifying the respective locations of the first, second and third routers and the movable device relative to each other within the bounded area.

2. The location determining system as claimed in claim 1, farther comprising:
   a fourth router, adapted for placement outside of the relatively horizontal plane, and being adapted to communicate in the wireless multihopping network to exchange with the first, second and third router and the movable device location information pertaining to its location; and wherein the monitoring device is adapted to receive the location information pertaining to the first, second, third and fourth routers and the movable device and to establish, based on the location information, the reference system identifying the respective locations of the first, second and third routers and the movable device relative to each other within the bounded area.

3. The location determining system as claimed in claim 1, farther comprising:

at least one data router, adapted for placement outside of a broadcast range of the movable device, and farther adapted to communicate in the wireless multihopping network to transmit the location information between at least one of the routers and the monitoring device.

4. The location determining system as claimed in claim 1, wherein:

the monitoring device is further adapted to generate a display representing the respective locations of the first, second and third routers and the movable device relative to each other within the bounded area.

5. The location determining system as claimed in claim 1, wherein:

the monitoring device is further adapted to generate mathematical coordinates representing the reference system.

6. The location determining system as claimed in claim 5, wherein:

the monitoring device is further adapted to manipulate the mathematical coordinates to verify accuracy of the representation of the respective locations of the first, second and third routers in the reference system.

7. The location determining system as claimed in claim 6, wherein:

the mathematical coordinates represent the plane in which the first, second and third routers are deployed; and the monitoring device is adapted to manipulate the mathematical coordinates as a mathematical representation of movement of the plane about an axis.

8. The location determining system as claimed in claim 1, wherein:

the location information exchanged between two of the routers includes time of flight information representing a duration of time for a message to travel between the two routers.

9. The location determining system as claimed in claim 1, wherein:

the first, second and third routers and the movable device are adapted to exchange messages between each other over reference links to gather data for the location information; and the first, second and third routers and the movable device are adapted to transmit the location information over data links.

10. The location determining system as claimed in claim 1, wherein:

the bounded area is a floor of a building, the relatively horizontal plane is the surface of the floor, the first, second and third routers are deployed about the floor, and the movable device is carried by a person moving about the floor.

11. A method for creating a location determining system, the method comprising:

deploying first, second and third routers in a relatively horizontal plane in a bounded area, such that a first direction intersecting the first and second routers is about perpendicular to a second direction intersecting the first and third routers;

operating each of the first, second and third routers to communicate in a wireless multihopping network to exchange location information with each other pertaining to their respective locations relative to each other;

deploying at least one movable device in the bounded area;

operating the movable device to communicate with the first, second and third routers in the wireless multihopping network to exchange with the first, second and third routers location information pertaining to its location;

receiving the location information pertaining to the first, second and third routers and the movable device at a monitoring device; and operating the monitoring device to establish, based on the received location information, a reference system identifying the respective locations of the first, second and third routers and the movable device relative to each other within the bounded area.

12. The method as claimed in claim 11, further comprising:

deploying a fourth router outside of the relatively horizontal plane;

operating the fourth router to communicate in the wireless multihopping network to exchange with the first, second and third router and the movable device location information pertaining to its location;

the monitoring device receiving step further comprises operating the monitoring device to receive the location information pertaining to the fourth router; and the monitoring device operating step further comprises operating the monitoring device to establish, based on the location information received from the first, second, third and fourth routers and the movable device, the reference system identifying the respective locations of the first, second and third routers and the movable device relative to each other within the bounded area.

13. The method as claimed in claim 11, further comprising:

deploying at least one data router outside of a broadcast range of the movable device; and operating the data router to communicate in the wireless multihopping network to transmit the location information between at least one of the routers and the monitoring device.

14. The method as claimed in claim 11, further comprising:

operating the monitoring to generate a display representing the respective locations of the first, second and third routers and the movable device relative to each other within the bounded area.

15. The method as claimed in claim 11, further comprising:

operating the monitoring device to generate mathematical coordinates representing the reference system.

16. The method as claimed in claim 15, further comprising:

operating the monitoring device to manipulate the mathematical coordinates to verify accuracy of the representation of the respective locations of the first, second and third routers in the reference system.

17. The method as claimed in claim 16, wherein:

the mathematical coordinates represent the plane in which the first, second and third routers are deployed; and the method further comprises operating the monitoring device to manipulate the mathematical coordinates as a mathematical representation of movement of the plane about an axis.

18. The method as claimed in claim 11, wherein:
the location information exchanged between two of the routers includes time of flight information representing a duration of time for a message to travel between the two routers.

19. The method as claimed in claim 11, further comprising:
operating the first, second and third routers and the movable device to exchange messages between each other over reference links to gather data for the location information; and
operating the first, second and third routers and the movable device to transmit the location information over data links.

20. The method as claimed in claim 11, wherein:
the bounded area is a floor of a building, the relatively horizontal plane is the surface of the floor, the first, second and third routers are deployed about the floor, and the movable device is carried by a person moving about the floor.

* * * * *